Figure 1:
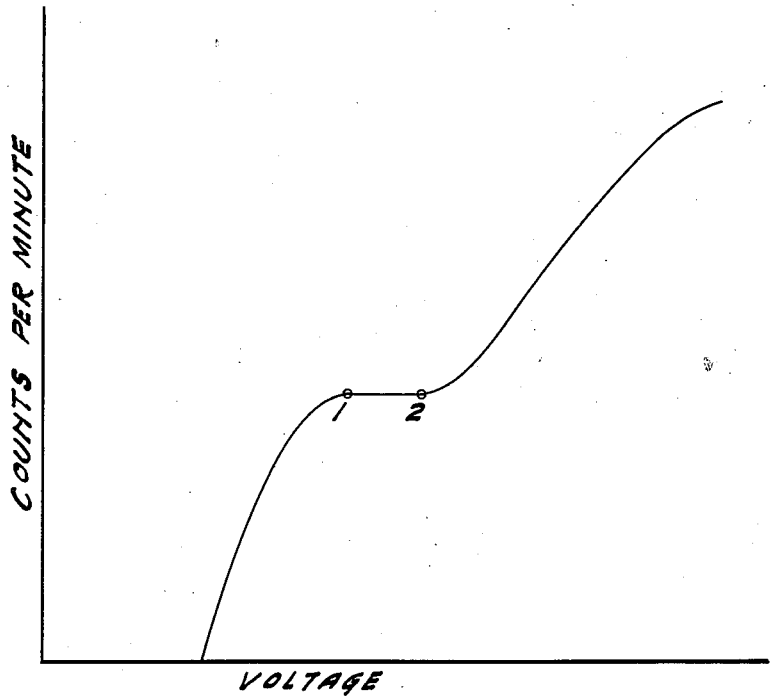

Oct. 16, 1951     F. M. GLASS     2,571,439
SYSTEM FOR DETERMINING TUBE CHARACTERISTICS
Filed March 10, 1950     3 Sheets-Sheet 1

INVENTOR.
FLOYD M. GLASS
BY
ATTORNEY

INVENTOR.
FLOYD M. GLASS
ATTORNEY

Patented Oct. 16, 1951

2,571,439

UNITED STATES PATENT OFFICE 2,571,439

SYSTEM FOR DETERMINING TUBE CHARACTERISTICS

Floyd M. Glass, Oak Ridge, Tenn., assignor to the United States of America as represented by the United States Atomic Energy Commission Application March 10, 1950, Serial No. 148,999

9 Claims. (Cl. 315—368)

1

My invention relates to systems for determining the characteristics of radiation responsive devices, and more particularly to a system for automatically plotting the plateau of the characteristic rise curve of a Geiger-Müller tube.

In general, when the potential across the counter is raised no effect will be noticed on the tube until the threshold voltage is reached, then a small increase in potential will cause the number of discharges or counts per unit time to rise quite abruptly to a certain value. Any further increase in the potential will cause very little change in the counts or discharges until what may be called the maximum operating potential of the counter is reached. A small increase from here on will cause a sudden increase in counts, which may soon go over into a glow discharge. The area or range of little change, referred to above, is usually designated the "plateau" and may cover a range of from 200 to 300 volts or longer. Since the tube is usually operated in some intermediate portion of the plateau or range, it is important to know the extent of the plateau as well as the general characteristic curve of the tube.

The general shape of the characteristic curve of a Geiger-Müller tube is well known. A normal procedure for obtaining the curve is to place a source of radiations near the tube, vary the voltage on the tube from zero to an upper limit in a series of separate adjustments, record the counts per minute of the output of the tube each time, and then plot the counts as ordinates against the tube voltage as abscissa. This is generally carried out with a scaler circuit which counts a representative number of pulses at each voltage impressed across the tube. Since each voltage is attained through manual adjustment, a great deal of time and an experienced operator are required in making the various counts over the voltage range of the tube, and to progressively collect the data for determining the various portions of the curve. The voltage limits of the plateau, referred to above, are different for each tube. Accordingly it is customary to plot the plateau for each tube to be placed in service. This plateau serves as a record of tube characteristics for all subsequent operations.

While some effort has been made to provide systems for automatically plotting the plateaus of tubes, they have been subject to the following disadvantages:

a. The entire plateau must be plotted at a sensitivity limited by the change of counting rate and size of the recorder scale.

b. The rate of change of voltage impressed on

2 the Geiger-Müller tube is not variable, since the recorder motor also drives the voltage control potentiometer arm.

c. A recorder must be especially modified to be used with those instruments, and d. The incremental voltage must always be applied in an increasing direction.

Applicant with a knowledge of all of these problems in the prior art has for an object of his invention the provision of a system for continuously and progressively plotting the plateau of a radiation sensitive tube.

Applicant has as another object of his invention the provision of a system for examining any desired part of the plateau of the characteristic curve of a radiation sensitive tube at maximum sensitivity.

Applicant has as a further object of his invention the provision of a system for examining the characteristics of a tube, and which is capable of applying a variable, reversible rate of change of voltage to the tube.

Applicant has as a still further object of his invention the provision of a system for quickly and readily examining the characteristics of a tube, and progressively plotting them to provide a characteristic curve therefor.

Other objects and advantages of my invention will appear from the following specification and accompanying drawings, and the novel features thereof will be particularly pointed out in the annexed claims.

Figure 2:
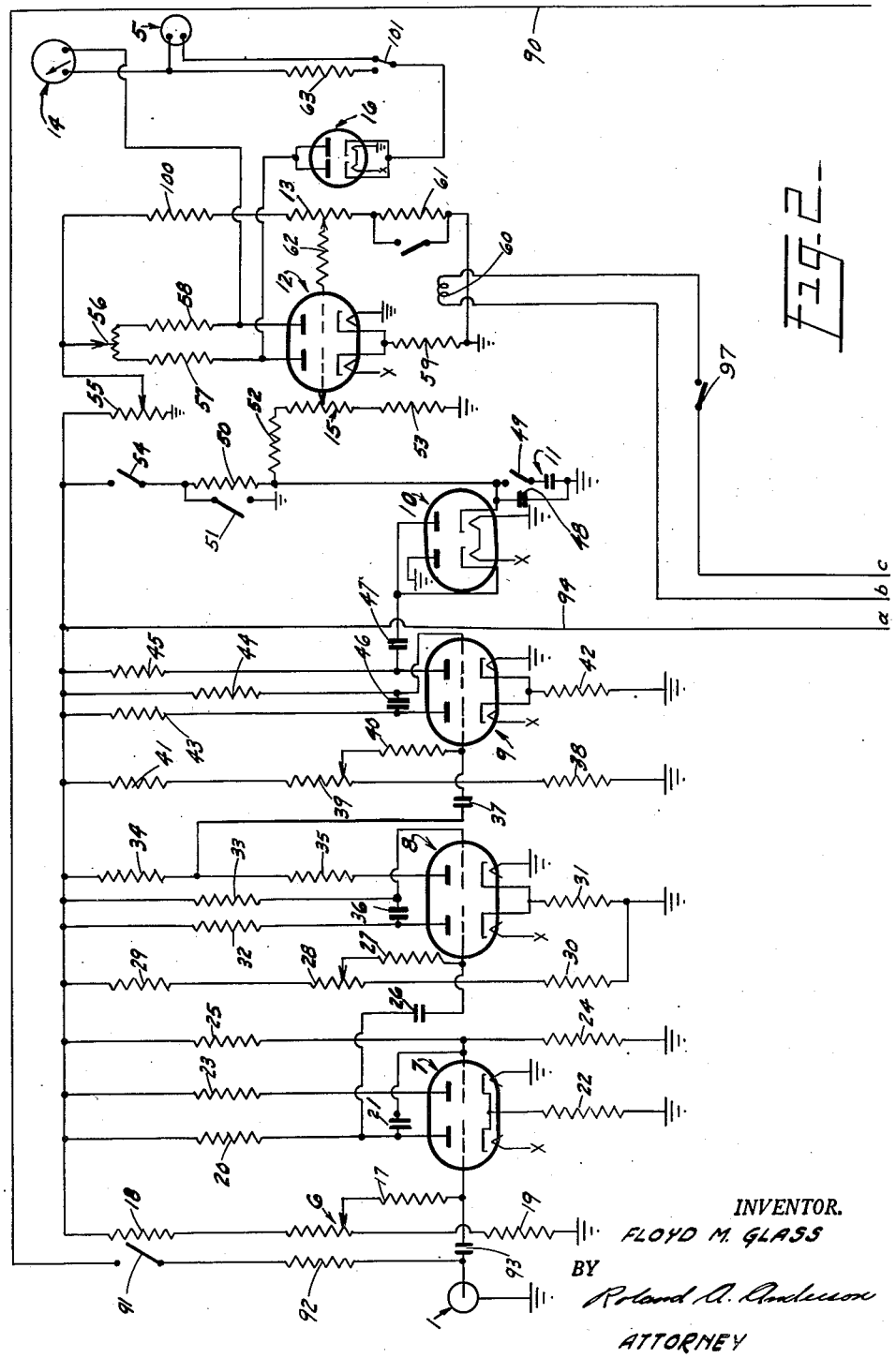
Figure 3:
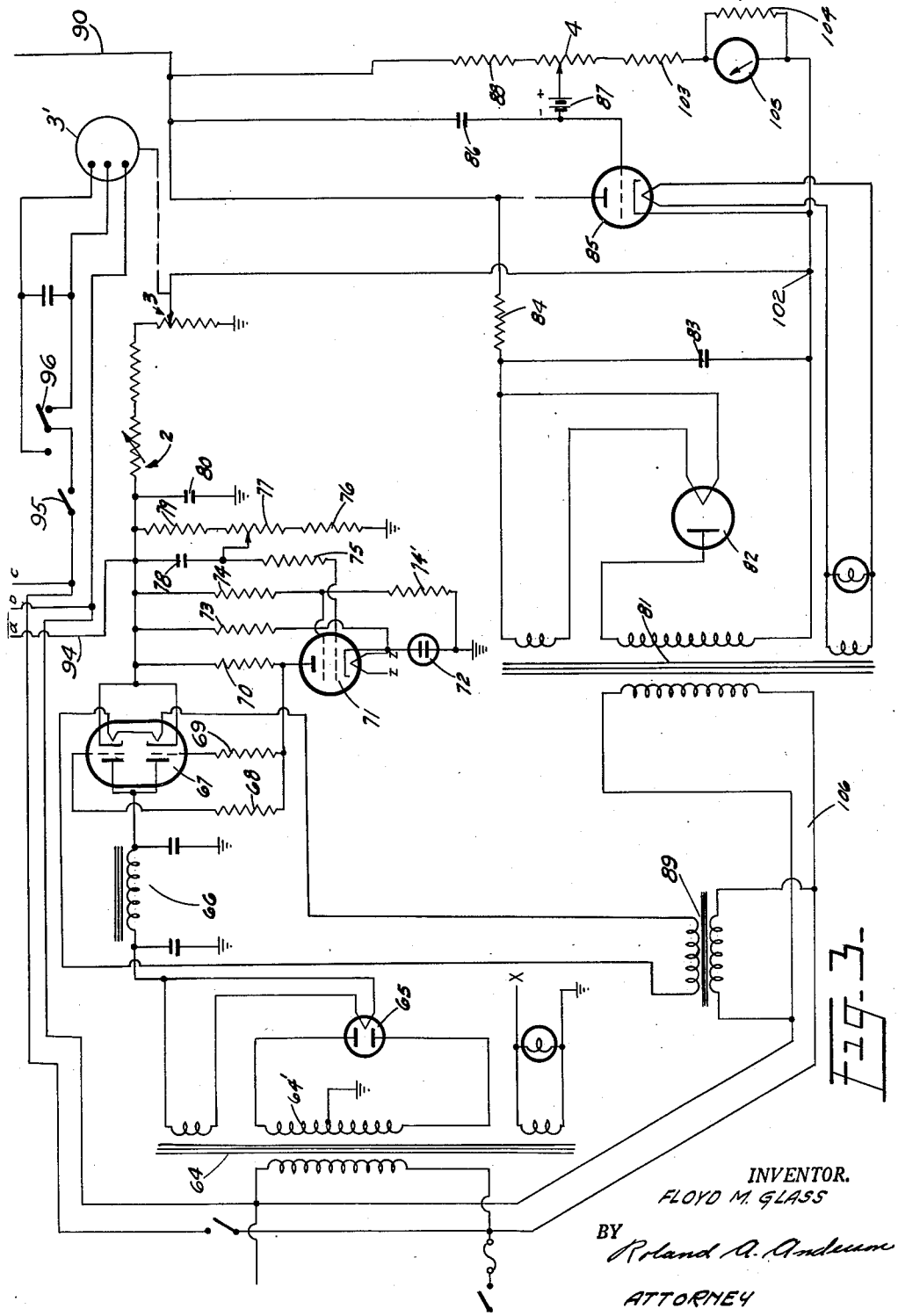

In the drawings, Fig. 1 is a typical characteristic curve, showing the usual plateau region, of a Geiger-Müller tube. Fig. 2 is a schematic of my improved system for automatically plotting the characteristic curve of a Geiger-Müller tube. Fig. 3 is a schematic of the power circuits for my improved plotting system.

Referring to the drawings in detail, I designates a conventional Geiger-Müller tube having its outer shell portion grounded and having its center wire maintained at a predetermined positive potential by a voltage regulated supply circuit shown in detail in Fig. 3. This voltage supply circuit includes the usual power transformer 64 having its primary connected to the 115 volt A. C. power line and having a plurality of secondary windings for supplying power to my improved system. The secondary winding at one extremity of the transformer provides the filament heating current for the various tubes as indicated by "x" in Fig. 2, while the secondary winding at the other end supplies the filament of the rectifier 65 of the power supply, as indicated in Fig. 3. The intermediate secondary winding 64' is of the split type having its center tap grounded and the two end leads connected to the plates of the rectifier 65 whose filament is connected to one of the outer secondary windings, as heretofore indicated. The rectifier tube 65 is then connected through a conventional capacitance-inductance filter 66 for removing the D. C. ripple, and this filter is in turn connected through a series regulator including double triode 67 with current limiting resistors 68, 69 in the grid circuits thereof. The output of the series regulator is in turn connected through a tetrode 71 which acts as a voltage amplifier and also provides correct phasing. This tetrode is fed from the unit through load resistor 70 and resistors 73 and 74, 74' which are bridged between the power unit and the cathode of tube 71 across voltage regulating tube 72 to provide the necessary operating potentials for the tube. The grid potential for the control grid of tetrode 71 is determined by the voltage divider with resistors 76, 77 and 79 with movable contact on resistor or potentiometer 77 serving to adjust the voltage on the control grid. Resistor 75 serves to couple the control grid of the tube 71 to the voltage divider, with capacitor 78 bridging grid resistor 75, and the power lead serving to pass quick changes in potential or surges to the control grid of tube 71 to adjust its conductivity and provide regulation.

Voltage for the center wire of the Geiger-Müller counter 1 is regulated by the adjustable resistor 2 which is in series with potentiometer 3 whose moving contact is coupled to the high voltage supply for the Geiger-Müller tube, as indicated hereinafter.

In this high voltage supply, power is fed from the power line through leads 106 to the primary of a second power transformer 81 which energizes a rectifier 82 with a pair of secondary windings, and feeds power through the rectifier to a condenser 83 which acts as a filter, and a series resistor 84 which may act as a load resistor. Bridged across the output is a shunt voltage regulator in the form of a triode 85. Bias and signal are supplied to the control grid of the triode from source 87 and the voltage divider 88, 4, 103 and 104 while quick changes in signal are applied to the grid through condenser 86 for the purpose of regulating the output voltage fed to line 90 which supplies the power through switch 91 and load resistor 92 to the center wire of the Geiger-Müller counter 1. Meter 105, shunted by resistor 104 serves to indicate the potential of the line.

The filaments of tube 67 are energized from the secondary of power transformer 89 while the filament of tube 85 is energized from a third secondary on transformer 81. If desired, the usual VR tube may be placed across these secondaries to regulate the voltage.

Geiger-Müller tube 1 feeds into a pulse limiting and shaping circuit. It is coupled through a condenser 93 to the control grid of the first section of a duo-triode tube 7 which serves as a part of a univibrator. The other portions of the univibrator include a common cathode resistor 22 connecting the cathodes of tube 7 to ground, a coupling condenser 21 which couples the output of the first section of duo-triode 7 to the control grid of the second section of that tube. Potential is supplied to the plates of the tube through load resistors 20 and 23. A grid leak resistor 24 bridges the control grid of the second section of tube 7 and ground, while the biasing potential is supplied through resistor 25 from line 94. The resistors 24 and 25 bridged across line 94 of the low potential power source to ground constitutes a voltage divider for normally maintaining the second section of tube 7 at cutoff potential.

The output of the first section of tube 7 is coupled through condenser 26 to the control grid of the first section of duo-triode tube 8 which forms a part of a second univibrator. Potential for the plates of tube 8 are supplied through load resistors 32, 34 from line 94 while common cathode resistor 31 connected from the cathodes of tube 8 to ground serves to provide a biasing potential. Voltage divider resistors 29, 28 and 30 cooperate through a moving contact on resistor 28 with grid resistor 27 to provide a positive biasing on the control grid of the first section of tube 8 from line 94. Resistor 32 bridges line 94 and the control grid of the second section of tube 8 to provide a positive potential greater than that of the grid of the first section of the tube to maintain the second section normally operative. The cathodes of the tube are tied together and grounded through a common cathode resistor 31. The two sections of tube 8 are coupled in cascade through condenser 36, and the output circuit of the second section is connected through a coupling condenser 37 to the control grid of the first section of duo-triode tube 9 which constitutes a part of a third univibrator. Load resistors 43 and 45 serve to provide potential for the plates of the two sections of tube 9 from line 94, while resistors 38, 39 and 41 form a voltage divider which is coupled through resistor 40 to the control grid of the first section of tube 9 to provide a positive bias. A common cathode resistor 42 is bridged between the cathodes of tube 9 and ground while line or B (+) potential is supplied to the control grid of the second section of tube 9 from line 94 through resistor 44. The output of the first section is coupled to the control grid of the second section of tube 9 through the condenser 46, and the output of the second section of tube 9 is coupled through condenser 47 to the tube 10.

The duo-diode tube 10 serves as a rectifier for the pulses from the univibrators which include tubes 7, 8 and 9. Disposition of the undesired portion of the wave is accomplished by grounding the anode of the first section while tying the cathode thereof to the anode of the second section. In this way any undesired portion of opposite polarity can be shunted to ground. The cathode of the second section of tube 10 feeds into an integrating or standard rate meter circuit including condensers 11 and 48 and resistors 15 and 53. Condensers 48 and 11 may be connected in parallel through a manually operated switch 49 and to resistors 15, 53 through a resistor 52. In addition, a resistor 50 is connected into the circuit at the juncture of the resistor 52 and condensers 11, 48. Closing of switch 54 may serve to charge the condensers through line 94 while the closing of switch 51 will provide a path to ground for discharging them.

Resistor 15 takes the form of a potentiometer with its moving contact connected to the control grid of the first section of duo-triode tube 12 which forms part of a vacuum tube volt meter, with the two anodes of the tube connected through bridge resistors 57, 58 to a balancing potentiometer 56 whose moving contact is joined to a circuit including a potentiometer 55 connected across from line 94 to ground, and resistors 61, 13 and 100. The resistor 13 is in the form of a potentiometer with the moving contact connected through resistor 62 to the control grid of the second section of tube 12. The cathodes of tube 12 are tied together and are coupled to ground through a cathode resistor 59. Bridged across the plates of tube 12 is a meter or galvanometer 14 coupled through duo-diode tube 16. Interposed in this circuit is a single pole double throw switch 101 for alternately inserting resistor 63, or a conventional recorder 5, such as an Angus recorder in the circuit. The Angus recorder is conventional to the prior art and is made by Easterline-Angus Company, Inc.

A relay 60 controlled by switch 97 and energized from the power line 106 may be employed to short out resistor 61. In addition, a motor 3' energized through switch 95 from the conventional power line may be operated in forward or reverse direction by single pole double throw switch 96 which serves to change the power connections to the windings. The motor 3' may then be mechanically connected through a conventional slip clutch (not shown) to actuate the arm of potentiometer 3, which may take the form of a conventional Helipot.

In the operation of the system, the tube under test is subjected to a stardard source of radiations and motor 3' is energized by closing the switches 95, 96, with the moving contact of potentiometer 3 set near ground potential. As the motor, which preferably rotates at about 6 R. P. M., slowly rotates, the contact on the potentiometer is slowly moved upwardly or around to increase the potential thereof above ground. This has the effect of raising the potential of point 102 of the high voltage supply source for the Geiger-Müller tube. Increasing the potential at 102 tends to create a bucking voltage, and has the effect of reducing the potential differences or voltage drops across the voltage divider including resistors 88, 103, 4, and shunt resistor 104 and meter 105. That in turn has the effect of lowering the potential on the control grid of triode 85, reducing its conductance, and in turn the drop across resistor 84 which increases the potential impressed across the Geiger-Müller tube 1. As the motor continues rotation, the potential across the Geiger-Müller tube is thus progressively increased.

When switch 91 is closed, a high positive potential from lead 90 is impressed through the load resistor 92 upon the center wire of the Geiger-Müller tube 1, but this high potential is blocked from reaching the control grid of the first section of tube 7 by condenser 93. When the tube 1 is subjected to radiations from an appropriate source, negative pulses are produced at the center wire thereof and these pulses are impressed through coupling condenser 93 upon the control grid of the first section of tube 7. Since the first section of the tube is normally conducting, these negative pulses reduce the conduction or cut off that section of the tube to produce positive pulses at the anode thereof which are passed through the coupling condenser 21 and are impressed upon the control grid of the second section of the tube to raise the grid potential thereof and cause it to conduct. This tends to maintain the bias produced by the voltage drop across the cathode resistor 22. After the charge is leaked off of the grid through the grid resistor 24, the second section of the tube becomes non-conducting, bias provided by cathode resistor 22 is reduced and the first section commences to conduct again. The length of time required for the tube to return to the stable conducting state, that is, with the first section of the tube normally conducting, is determined by the constants of the circuit. Signal in the form of a rectangular shaped pulse, substantially independent in size and configuration from the original pulses impressed upon the circuit, appears at the plate of the first section and is transferred through the coupling condenser 26 to the control grid of the first section of the duo-triode tube 8.

While the control grid of the first section of tube 8 is normally maintained at a predetermined positive potential by virtue of the voltage drops through resistors 29, 28 and 30, the control grid of the second section of tube 8 is maintained at a substantially higher potential by being coupled through resistor 44 to the B (+) of line 94. Therefore, it is apparent that this latter grid, maintained at the higher potential, will cause the second section of tube 8 to conduct in preference to the first section, since the high positive potential on the control grid of the second section will be sufficient to overcome the bias introduced by the drop across cathode resistor 31. Accordingly the second section of the tube is normally conducting while the first section will remain non-conducting. However, application of the positive pulse from the plate of the first section of tube 7 to the control grid of the first section of tube 8 raises the potential of that grid to a point where it overcomes the bias due to the drop through cathode resistor 31. This, in turn, causes the first section of tube 8 to conduct, producing a negative pulse on the plate thereof, and this negative pulse passes through condenser 36 and is impressed upon the control grid of the second section of that tube causing the potential thereof to drop and permitting the cathode bias to cut it off. This condition exists for the duration of the pulse, but depends on the constants of the circuit. The cut off of the second section of tube 8 produces a positive pulse at the plate thereof which is passed through coupling condenser 37 to the control grid of the first section of tube 9. This positive pulse raises the potential of the grid thereof and overcomes the bias introduced by the drop across cathode resistor 42, causing the first section of the tube to conduct. As in the previous tube the potential of the control grid of the first section coupled through resistor 40 to the voltage dividers 38, 39, 41 is at a lower potential than the grid of the second section of the tube which is coupled through the resistor 44 to the B (+) power lead 94. This produces a condition where the second section of the tube is normally conducting. In this state the positive pulse, referred to above, impressed upon the grid of the first section of the tube through coupling condenser 37 causes the potential to rise and overcomes the bias introduced by the drop across the cathode resistor 42, causing the first section to conduct. This produces a negative pulse on the plate thereof which is transferred through the condenser 46 to the control grid of the second section of the tube causing its grid potential to be lowered, and permitting the cathode bias resulting from the drop across cathode resistor 42 to cut off the operation of the second section of this tube. This negative pulse which drives the second section of the tube to cut off, produces a positive pulse on the plate thereof. This positive pulse is then impressed through condenser 47 and rectifier 10 upon the integrating circuit 11, 48, 15. As in the previous univibrator circuits, the duration of cut off of the second section of tube 9 will depend upon the constants of the circuit.

It will be noted that the circuit includes three univibrators. In providing three univibrators in the circuit, instead of a single univibrator, it is possible to isolate the final output pulse from the size and shape of the original pulse of the Geiger-Müller counter and to eliminate or reduce the effects of changes in the characteristics of the tubes. The univibrators are conventional components of a circuit, in general are old and well known components in the art, and their action and operation are described in the prior co-pending application of Parsons, S. N. 53,794.

The integrating or rate meter circuit 11, 48, 15 receives the rectified pulses from the rectifier 10. These pulses are of uniform magnitude and build up a charge on the condensers 48, 11 of the integrating circuit. The charge built up on these condensers is continuously leaked off through the resistors 15, 53, and the magnitude of charge on the condensers at any particular time is proportional to the number of the pulses reaching the integrating circuit. This rate meter circuit is similar in principle to many others used in the field of radiation detection and measurement, and the underlying principles thereof are set forth in an article in volume 7 of the Review of Scientific Instruments at page 450.

The drop across the potentiometer 15 and resistor 53 of the integrating circuit is applied to the control grid of the first section of duo-triode tube 12 causing the first section of that tube to conduct. This changes the impedance of the bridge including resistors 57, 58 and the two sections of tube 12 causing current flow through the diode 16, meter 14, and recorder 5. This provides an indication on the meter 14 and produces a record on the recorder 5 of the number of counts or pulses per unit time.

It will be apparent that as the motor 3' continues to rotate and move the contact over the potentiometer 3, the potential impressed at line 90 from the high potential source, continues to rise. This slowly increases the potential impressed across the Geiger-Müller tube 1 and in accordance with the characteristics of the counter changes the number of pulses produced by it for translation through the univibrator circuits, and for application to the integrating circuit for the subsequent measuring and recording by the vacuum tube volt meter and recorder. If the whole characteristic curve is desired, the motor 3' is permitted to continue to rotate until the potentiometer 3 reaches the maximum position covering the full voltage spectrum of the counter. After that further rotation of the motor 3' does not further actuate the moving contact of the potentiometer due to the action of the slip clutch which permits relative rotation between motor 3' and the moving contact of the potentiometer. It will thus be seen that the slip clutch provides a safety feature for preventing any injury to the potentiometer or motor if the switch 92 is not opened immediately upon the moving contact reaching its upper extremity.

To quickly reach the plateau, it may be desirable to open the switch 49 since the lower capacity of the small condenser 48 permits rapid operation to locate the threshold potential of the Geiger-Müller tube. The biasing potential on the control grid of the second section of tube 12 is made adjustable in order to change the operation of the vacuum tube volt meter and provide a suppressed zero setting therefor. The rectifier 16 acts to keep the voltage off of the meter 14 and recorder 5 until the time constant of the integrating circuit permits application of voltage to the vacuum tube volt meter.

As an alternative this system may be adapted for use in determining the characteristics of tubes operating in the proportional range, and may also be useful in examining other types of radiation detecting devices. This may be accomplished by simply interposing a conventional amplifier (not shown) between the tube 1 and the pulse limiting and shaping circuit which includes tubes 7, 8 and 9. In this way selected signals from the tube 1 in various ranges may be raised to the desired level before feeding them into the pulse limiting and shaping circuit.

Having thus described my invention, I claim:

1. A system for determining the characteristics of a counter comprising a source for applying an energizing potential across the counter and for progressively increasing this potential over the voltage spectrum thereof, a pulse limiting and shaping circuit for receiving the output of the counter, means for rectifying the output of the pulse limiting and shaping circuit, an integrating circuit coupled to the rectifying means, and means for recording the output of the integrating circuit.

2. A system for determining the characteristics of a counter comprising a source for applying an energizing potential across the counter and for slowly increasing the potential to progressively sweep the voltage spectrum, a pulse limiting and shaping circuit for receiving the output of said counter, means for rectifying and integrating the output of said pulse limiting and shaping circuit, and a vacuum tube voltmeter coupled to the rectifying and integrating means for measuring the output of the counter.

3. A system for determining the characteristics of a counter comprising a source for supplying an energizing potential across the counter and for slowly increasing the potential to progressively sweep the voltage spectrum, a pulse limiting and shaping circuit for receiving the output of the counter, a rectifier coupled to the output of the limiting and shaping circuit, a rate circuit for integrating the output of the rectifier, and a vacuum tube voltmeter fed by the integrating circuit for measuring the output of the counter.

4. A system for determining the characteristics of a counter comprising a source for supplying a potential across the counter, means for continuously increasing the potential to sweep the voltage spectrum, a pulse limiting and shaping circuit for receiving and equalizing the pulses from the counter, a rectifier coupled to the pulse limiting and shaping circuit, an integrating circuit fed by the rectifier for providing a signal corresponding to the pulse rate from said counter, a vacuum tube voltmeter circuit connected to the integrating circuit, and a recorder for measuring the output of said vacuum tube voltmeter circuit.

5. A system for determining the characteristics of a counter comprising a source for supplying a potential across a counter, means for progressively increasing the potential to sweep the voltage spectrum, a plurality of univibrators for receiving and equalizing the pulses from the counter, and means for converting the output of said univibrators into signals corresponding to the rate of pulses from said counter, and means for indicating the pulse rate.

6. A system for determining the characteristics of a counter comprising a source for applying a potential to the counter, means for continuously changing the potential to sweep the voltage spectrum, a plurality of univibrators for equalizing the pulses from the counter, means coupled to the output of said univibrators for rectifying and integrating the signals therefrom to produce output voltages corresponding to the pulse rate of the counter, and means for indicating the pulse rate.

7. A system for determining the characteristics of a counter comprising a source for applying potential to the counter, means for progressively increasing the potential of said source to sweep the voltage spectrum, a plurality of univibrators for receiving and equalizing the pulses from the counter, means coupled to the univibrators for converting their output into signals corresponding to the rate of pulses from said counter, a vacuum tube voltmeter fed by the converting means, and a recorder for measuring the pulse rate.

8. A system for determining the characteristics of a counter comprising a source for applying a potential to the counter, means for progressively increasing the potential to cover the voltage spectrum, a plurality of univibrators for receiving and equalizing the pulses from the counter, rectifying and integrating means coupled to the univibrators for converting their output into signals corresponding to the pulse rate of the counter, and means fed by the rectifying and integrating means for recording the pulse rate.

9. A system for determining the characteristics of a counter comprising a source of potential for the counter, power means for continuously adjusting the potential to sweep the voltage spectrum, a series of univibrators connected in cascade for receiving and equalizing the pulses from the counter, a rectifier fed by the univibrators for rectifying the pulses, an integrating circuit coupled to the rectifier for converting the rectified pulses into signals corresponding to the pulse rate of the counter, a vacuum tube voltmeter circuit connected to the integrating circuit, and a recorder coupled to the output of the vacuum tube voltmeter circuit for recording the pulse rate.

FLOYD M. GLASS.

REFERENCES CITED

The following references are of record in the file of this patent:

UNITED STATES PATENTS

| Number | Name | Date |
|---|---|---|
| 2,491,904 | Poole | Dec. 20, 1949 |
| 2,495,072 | Molloy | Jan. 17, 1950 |
| 2,499,953 | Herzog | Mar. 7, 1950 |
| 2,506,435 | Rossi et al. | May 2, 1950 |